United States Patent [19]

Wilkinson

[11] Patent Number: 5,218,486

[45] Date of Patent: Jun. 8, 1993

[54] CORRECTION OF LONG TERM DRIFT AND SHORT TERM FLUCTUATING CORRUPTION OF A SIGNAL

[75] Inventor: Robert G. Wilkinson, Portsmouth, England

[73] Assignee: The Secretary of State for Defence in her Britannic Majesty's Government of the United Kingdom of Great Britain and Northern Ireland, London, England

[21] Appl. No.: 543,760

[22] PCT Filed: Jan. 27, 1989

[86] PCT No.: PCT/GB89/00087

§ 371 Date: Jul. 17, 1990

§ 102(e) Date: Jul. 17, 1990

[87] PCT Pub. No.: WO89/07314

PCT Pub. Date: Aug. 10, 1989

[51] Int. Cl.[5] .......................... G11B 5/02; G11B 20/20
[52] U.S. Cl. ........................................... 360/27; 360/26
[58] Field of Search ................... 360/26, 27, 28, 36.1, 360/70

[56] References Cited

U.S. PATENT DOCUMENTS

| | | | |
|---|---|---|---|
| 3,686,432 | 8/1972 | Deguchi et al. | 360/70 |
| 3,831,192 | 8/1974 | Gross et al. | 360/27 |
| 4,286,294 | 8/1981 | Nakauchi et al. | 360/27 |
| 4,535,368 | 8/1985 | Schwartz et al. | 360/28 |
| 4,646,173 | 2/1987 | Kammeyer et al. | 360/51 |

FOREIGN PATENT DOCUMENTS 118056 7/1973 Japan .
87227368/32 12/1986 U.S.S.R. .
1494510 12/1977 United Kingdom .

Primary Examiner—Andrew L. Sniezek
Assistant Examiner—Won Tae C. Kim
Attorney, Agent, or Firm—Nixon & Vanderhye

[57] ABSTRACT

An arrangement to remove drift and wow and flutter in a tape recording comprising recording a control signal tone derived from a reference clock (159) in a dedicated control channel or embedded in a signal channel. The control signal on playback (151) is compared to the reference signal in an up/down counter (172) and the difference is used to correct the speed of the tape drive. The drift corrected control tone signal is connected through a programmable RAM delay (154) and a latch (179) to a D/A converter (156). The delayed analogue control signal and the reference signal are limited then connected to phase comparator counter (158) which is triggered by the leading edge of the reference signal and read by the leading edge of the squared control signal to measure the time delay between them as a number of RAM (154) samples (N) and subsamples (n). The measured time delay is used to advance or retard the Read address (155) relative to the Write address in the RAM delay (154) where unit change in the tap address (N) is equal to 20 usec in the example. The remaining time delay (0–19) usec is connected to a phase delay circuit (178) effective to delay readout from the RAM via the latch (179) in one microsecond intervals in the example.

27 Claims, 13 Drawing Sheets

CORRECTION OF LONG TERM DRIFT AND SHORT TERM FLUCTUATING CORRUPTION OF A SIGNAL

BACKGROUND OF THE INVENTION

1. Field of the Invention

The invention relates to signal processing and in particular, though not exclusively, to the correction of drift and wow and flutter in signals that have been recorded.

2. Discussion of Prior Art

When a signal is transmitted through a medium, there may be fluctuating and drift time delays imposed on the signal due to changes in the propagating medium. Such a medium may have an analogue in a tape recording system where a signal is subjected to delays during recording and playback.

When making recordings of signals it is impossible to maintain a perfectly constant tape speed because of limitations imposed by mechanical and environmental conditions. There will therefore be short term variations (wow and flutter) and also long term variations (drift) in the recorded, and subsequently, played back signals. The short term variations appear as a recognisable frequency modulation on the recorded signals. The maximum deviation of this change in frequency will depend upon the mechanical precision of the recording system as will the frequency of modulation (rate of variation). Variation frequencies up to 10 Hz are normally referred to as 'wow' whilst those above 10 Hz are called 'flutter'. Very slow variations and steady state errors (long term average speed errors) are called 'drift'. These speed induced drift errors are responsible for creating timing inaccuracies during playback and from recording to recording etc. Drift is likewise caused by the limited precision of the mechanical drive but it is also dependent upon the elasticity properties of the tape, tape tensions, the surface properties of the tape, the ambient temperature, air humidity and upon any variations in mains supply.

Wow, flutter and drift performances can often be held within acceptable limits without resorting to sophisticated systems since the human ear is unable to detect some short term frequency variations (wow and flutter) with the same level of perception over the entire audio frequency range. Thus it is possible to minimise the apparent wow and flutter by ensuring that the predominant frequency of variation is not close to 4 Hz, the frequency of maximum perception.

When used for recording and playback of data, however, modern electronic systems can be susceptible to very small frequency, phase and time discrepancies. Thus, when recordings are made of particular 'time synchronous' and phase modulated signals, these signals will be corrupted by the relatively very much larger phase distortions produced by the wow and flutter, and the drift will cause time slip and frequency shifting in the playback signal.

SUMMARY OF THE INVENTION

The object of the invention is to provide means to reduce or overcome short-term and drift time delays experienced by a signal transmitted via a medium such as a recording medium.

The invention provides in one form a signal correction system for a recording system comprising a means to transmit for recording a signal and a control reference tone and playback receiving means to receive the signal and the reference tone, wherein the receiving means includes a local oscillator means to produce an identical tone to the transmitted control reference tone and comparator means to compare the frequency of the control tone with the local oscillator tone; characterised in that: the receiving means further includes:

a) drift correction means connected to the frequency comparator means to apply a common frequency shift to the received signal and the reference tone to reduce to zero the difference output from the frequency comparator; the frequency conparator including means to continuously count the cycles of the received reference and the local oscillator tones such that differences between the running counts of the two tones are repetitively used for drift correction;

b) a phase comparator circuit to compare the phase of the drift-corrected reference tone with the phase of the local oscillator tone; and c) short term flutuation correction means connected to the phase comparator circuit to apply to the received signal and the drift-corrected reference tone a common phase delay to reduce to zero the difference output from the phase comparator.

In an alternative form the invention provides a signal correction system comprising a transmission means to transmit a signal and a control reference tone and receiving means to receive the signal and the reference tone, wherein the receiving means includes a local oscillator means to produce an identical tone to the transmitted control reference tone and comparator means to compare the frequency of the control tone with the local oscillator tone; characterised in that; the receiving means further includes:

a) correction means connected to the frequency comparator means to apply a common frequency shift to the received signal and the reference tone to reduce to zero the difference output from the frequency comparator; the frequency conparator including means to continuously count the cycles of the received reference and the local oscillator tones such that differences between the running counts of the two tones are repetitively used for correction;

b) a phase comparator circuit to compare the phase of the frequency-corrected reference tone with the phase of the local oscillator tone; and c) short term flutuation correction means connected to the phase comparator circuit to apply to the received signal and the frequency-corrected reference tone a common phase delay to reduce to zero the difference output from the phase comparator.

In one arrangement the frequency comparator means comprises a cyclic binary counter having an output clocked by a signal derived from the local oscillator. Conveniently the cycling of the binary counter is determined by a detector connected to the counter and responsive to a predetermined binary number ($N_p$) to provide a reset signal to the counter. Preferably the local oscillator-derived clock signal is produced by connecting the local oscillator signal to the input of a divide-by-$N_p/n$, where n is an integer. Conveniently the output from the binary counter is clocked into an output latch circuit and the latch output is connected to a D/A converter to produce an analogue signal representative of the frequency time/drift between the received reference tone and the local oscillator tone. Preferably the received reference tone is bandpass filtered and limited to minimise the effects of fading and dropouts. The drift representative D/A output samples may be connected to an active voltage integrator circuit comprising a transconductor and a capacitor.

Preferably the drift-corrected reference tone is connected via a fast programmable delay circuit to the phase comparator circuit and in the above arrangements the short term fluctuation correction means preferably comprises the programmable delay circuit and a voltage controlled oscillator (VCO), the arrangement being such that the voltage output from the phase comparator is connected to the input of the VCO and the VCO output is connected to the delay circuit such that the phase comparator error output is minimised.

Advantageously limiters are provided in the circuit connections to the inputs of the phase comparator. Preferably the output signal from the VCO is connected to a second delay circuit, identical to the first: the draft corrected received signal being connected to the input to the second delay circuit and the drift and short term fluctuation corrected signal being provided at the output thereof. Low pass filters may be provided at the input and output of the second delay circuit. Each delay may be a digital delay. More than one phase comparator stages of short term fluctuation correction may be provided.

In a particular arrangement 6 dB/octave low pass filter is connected between the phase comparator and the VCO whereby the loop gain of the wow and flutter correction circuit decreases inversely in proportion to the modulation frequency. This has been used to obtain inherent stability within the closed loop of an analogue circuit. A digital implimentation may incorporate more advanced techniques to allow a higher gain and greater bandwidth to be useful.

In a particular arrangement of the invention for reduction of drift, wow and flutter in a tape recorder a single stable reference oscillator is provided and arranged for connection to the tape recorder such that on record a control reference tone is connected to at least one tape recorder input with the frequency comparator and phase comparator circuits disabled and on playback the recorded signals to be corrected, together with the recorded reference tone, are connected to the signal correction system.

The reference signal may be provided as a reference embedded in each input channel of a multi-channel recorder or as a reference in a dedicated reference channel.

When applied to a tape recorder, the drift correction means includes a signal connected from the output of the frequency comparator to the tape capstan motor drive to vary the drive speed. In one example a light dependent resistor may be used to correctly interface with the recorder.

In an alternative arrangement the frequency comparator means comprises an up/down counter, the received control tone and the local reference tone being connected to respective count down and count up inputs and the output difference signal being connected to a means effective to reduce the to zero the frequency difference between the control tone and the reference tone.

The phase time delay for correcting the remaining phase differences between the control and reference tone may advantageously be applied by a digital time delay circuit comprising in series a programmable RAM delay and a RAM latch, and a phase adjuster for the latch, the arrangement being such that digital signal samples are clocked in to the Write address of the RAM delay at frequency F and are read out from a programmable Read address to the latch to provide a time delay having incremental value $\Delta T$ of $1/F$, the clock signal to the RAM latch being delayed by a digitised time having an incremental value $\Delta t$ in the range 0 to $1/F$, to thereby provide an overall time delay to an accuracy of $\Delta t$.

Advantageously the phase comparator comprises limiter means to square the control signal and the replica reference signal and a counter clocked by the reference signal and read by the squared control signal. Preferably the counter clock frequency is n times the RAM clock frequency F and the phase comparator measures the phase difference in units (N) of $1/F$ and (R) of $1/nF$.

Conveniently there is provided means whereby the digitised phase difference $N+R$, which may be positive or negative, is modified by conditional change of N such that R always represents a delayed phase difference. Conveniently also, the Read address for the RAM is stored in a Read latch connected to an adder such that it can be adjusted by the modified N. R is then used to set the delay for the RAM latch.

BRIEF DISCUSSION OF THE DRAWINGS

The invention will now be described by way of example only with reference to the accompanying Drawings of which:

DETAILED DISCUSSION OF PREFERRED EMBODIMENTS

Figure 1:
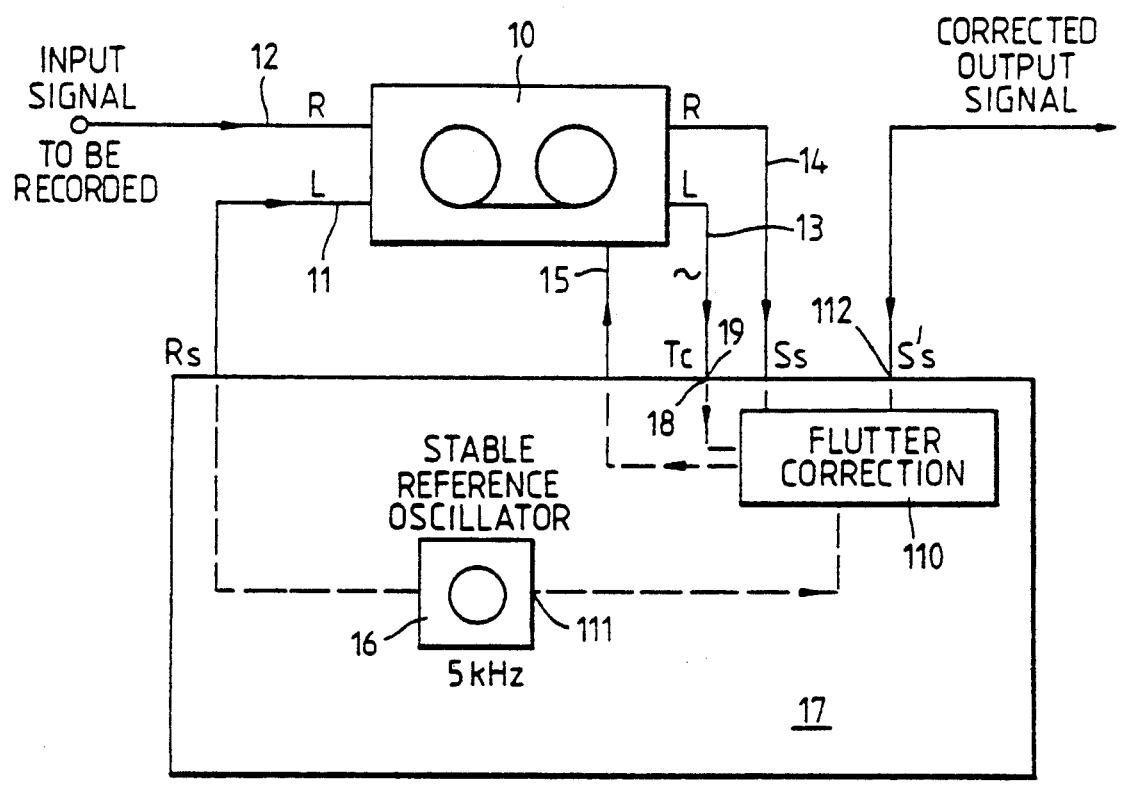
FIG. 1 shows a block diagram of an example of the invention applied to the correction of a tape recorder drift, wow and flutter.

FIG. 1 shows a two-channel tape recorder 10 having L and R inputs 11,12, L and R outputs 13,14 and a tape drive speed control input 15. In this arrangement an input signal to be recorded is connected to the R input 12 and simultaneously a stable 5 kHz reference signal $R_s$ from an oscillator 16 in a drift, wow and flutter correction circuit 17 is connected to the L input 11. On playback, the recorded reference signal $T_c$ and input signal $S_s$ are connected to inputs 18,19 to the correction system 17. As will be described in greater detail, the recorded reference signal is compared (110) with the signal from the output 111 of the oscillator 16 to provide:

a) an output signal for connection to the speed control input 15 to the tape recorder to change the tape drive speed to correct the effect of drift in the output channels; and b) a signal for correcting residual frequency fluctuations in the output channels.

The corrected output signal $S'_s$ is then provided at the signal output 112 of the correction circuit 17.

During a recording the correction circuit 17 is only used to provide the stable 5 kHz reference control tone $R_s$; the tape speed drift control and the wow and flutter correction circuitry being disabled.

Figure 2A:
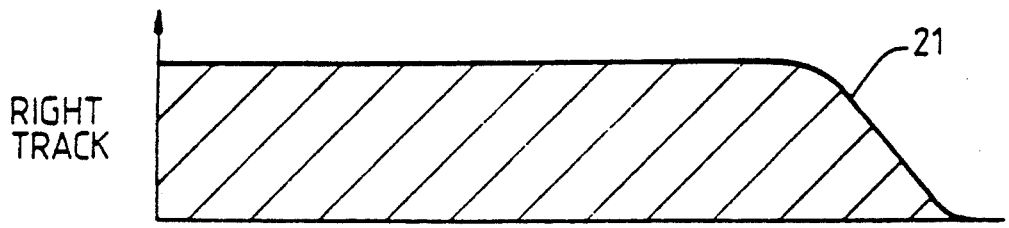
FIGS. 2a, 2b, 2c and 2d illustrate the signal formats for correction of a single wideband channel and for dual 3 kHz channels.
Figure 2B:
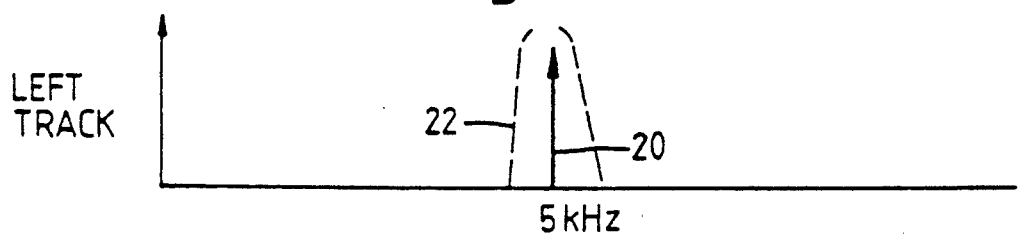

FIGS. 2a and 2b illustrate the spectra of recorded signals on the tracks of a 2-track tape recorder. On one track the 5 kHz control tone 20 is recorded at a frequency positioned within the bandwidth of the recorded signal S(F), 21. Also shown in FIG. 2b is the response 22 of a 5 kHz band pass filter which would generally be used at the playback output to improve the signal to noise in the control tone channel.

The advantage of the FIGS. 2a and 2b arrangement using a dedicated reference tone channel or track is that the input signal being recorded can have a frequency response which overlaps the control tone frequency. On the other hand one track must be exclusively assigned for the control tone. A further disadvantage is that phase-shifting errors can exist between any two (or more) recorded tracks. This problem occurs because the tape will 'skew' as it passes over the record and playback heads. This is generally accepted as an insignificant factor during a recording (and playback) but it can now become the dominant limiting factor if a correction system is employed (particularly if a cascaded technique is used to reduce wow and flutter to very small levels). This is because the system is unable to correct the phase skew errors produced between the control tone track and the signal tracks. Unfortunately, these interchannel phase errors can be much greater than the residual errors after correction.

Figure 2C:
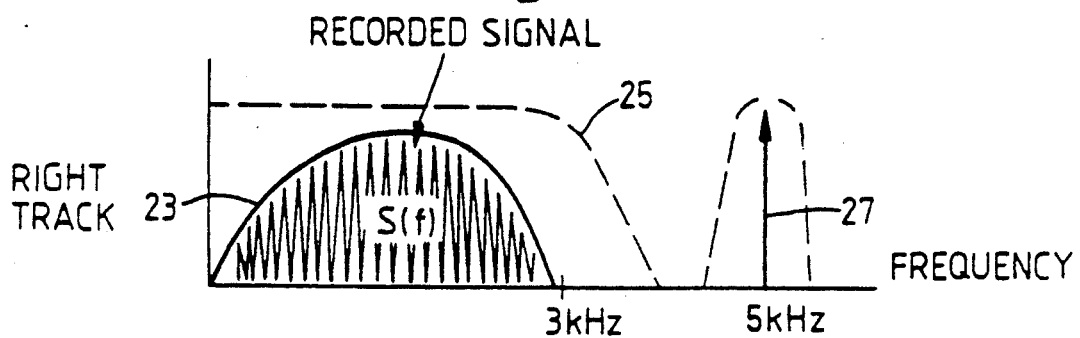
Figure 2D:
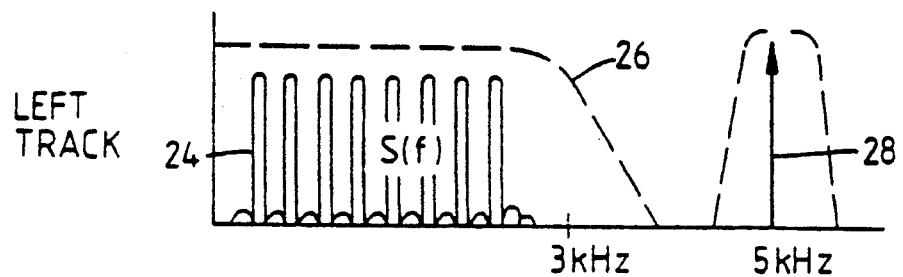

FIGS. 2c and 2d illustrate the frequency spectra in an alternative 2-channel recording system with each channel having a signal bandwidth of 3 kHz. The right and left recorded signal spectra (FIGS. 2c and 2d, respectively) are indicated by reference numerals 23 and 24, and these are filtered by 3 kHz low pass filters 25, 26 respectively before processing by a correction circuit. In this arrangement a control tone 27, 28 of 5 kHz, i.e. above the upper frequency limit, is recorded on each channel together with the two channel signals. Each channel can then be processed separately to correct for drift, wow and flutter.

Ultimately, interchannel phase errors will depend on the quality of the tape recorder being used and their effect will depend upon the desired wow and flutter figures to be achieved. If the required wow and flutter figures cannot be achieved using a dedicated control tone channel it may be necessary to use an embedded control tone in every recording channel as in FIG. 2b. Unfortunately, this can only be achieved with greater electronic complexity and provided (at all times) that the recorded signal frequencies will be less than the control tone. The frequency of the control tone should ideally be as high as possible because higher frequencies have a greater change in deviation frequency impressed upon them due to drift, wow and flutter. This makes it much easier to detect the highest rates of change (flutter) and reduces the risk of instability in the correction system because loop gains can be minimised. If the control tone can have a higher frequency than the signals to be recorded then the detection circuits will operate with a higher resolution than the signals it must correct because it will have higher frequency deviations. This optimises the correction process. There may however be special exceptions to this if the signals to be recorded have gaps within their spectra which can be used to place the control tone. Unfortunately it is not possible to use the maximum frequency (that can normally be recorded as a signal) for the control tone because 'drop out' and fading has a much greater effect at these frequencies. For this reason the control tone frequency will depend on the performance of the tape recorder being used. Any complete drop outs, or deep fades, in the control tone signal will have a serious effect on the operation of the correction system because it will produce instantaneous phase and drift discontinuities. Fortunately it is however possible to compensate for very short or rapid drop-outs and all but the deepest fades by using electronic filtering. This will be described later.

Figure 3:
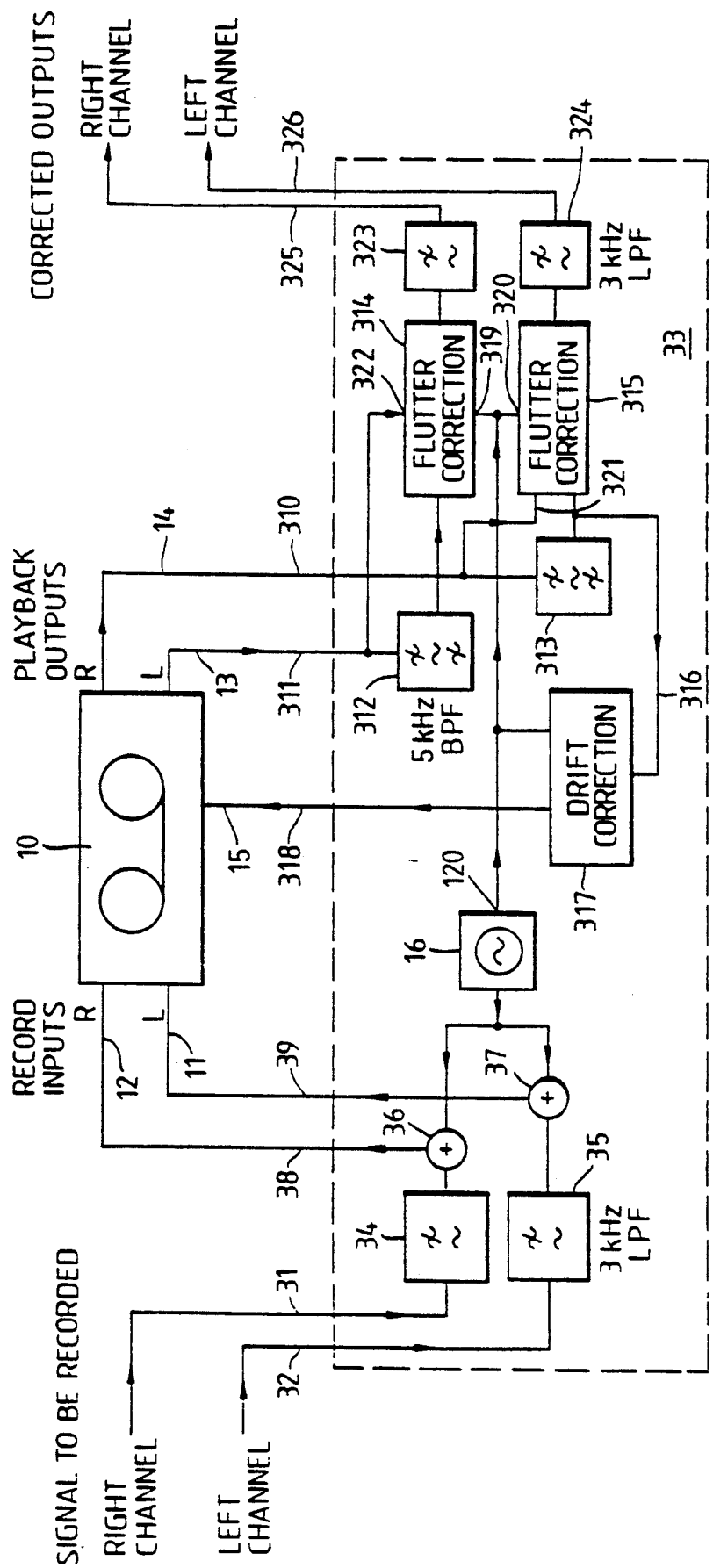
FIG. 3 shows a block diagram of the FIG. 1 arrangement applied to a dual 3 kHz channel recording system.

A modified version of the FIG. 1 arrangement adapted for two channel recording as illustrated in FIGS. 2a and 2b is shown in FIG. 3. Signals to be recorded are connected to inputs 31, 32 of the correction circuit 33 where they are first filtered by 3 kHz low band pass filters 34, 35 and then mixed (36, 37) with the 5 kHz reference tone from the oscillator 16.

Signals from the mixers 36, 37 at outputs 38, 39 of the correction circuit 33 are connected to the respective record inputs 12, 11 of the tape recorder 10. The tape recorder playback outputs 14, 13 are connected to inputs 310,311 of the correction circuit 33. The 5 kHz reference tones from the two channels are selected by band pass filters 312,313 and are then connected to inputs to respective flutter correction circuits 314,315. One reference tone (316) is also connected to a drift correction circuit 317 together with the 5 kHz output (120) from the oscillator 16 to provide a tape speed correction signal at output 318 of the correction circuit 33 for connection to the tape recorder motor speed control input 15. The 5 kHz output (120) from the oscillator 16 is also connected to respective inputs 319,320 of the flutter correction circuits 314,315 where phase comparison is made with the 5 kHz output control signals. The two channel outputs 14,13 are also connected directly to the respective inputs 321,322 of the flutter correction circuits 314,315. After phase correction the output signals are filtered by 3 kHz low pass filters 323,324 and then connected to respective right and left channel outputs of the correction circuit 33.

The above arrangement applied to multi-channel recording enables reduction of drift, wow and flutter in even unmeasureable levels. In addition, interchannel 'skew' phase errors are automatically removed. Sound recordings made with this type of system will therefore reproduce exactly the spatial content of the original sound.

Figure 4A:
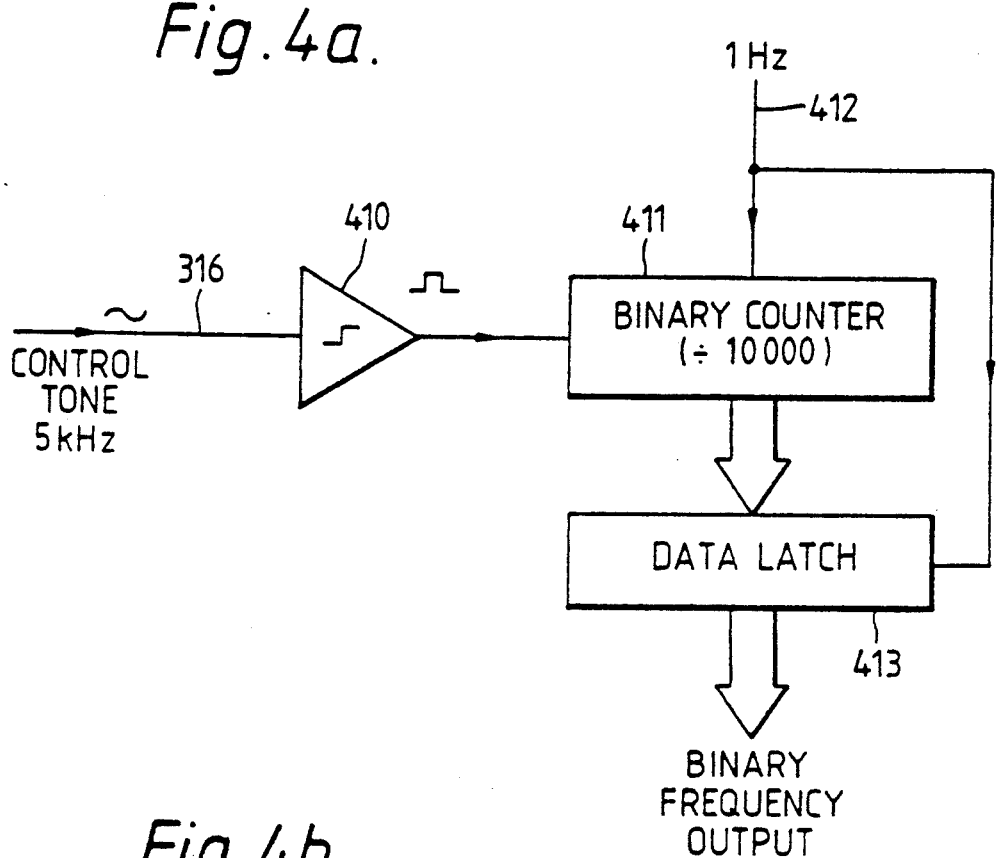
FIG. 4a is a block diagram of a standard frequency measurement circuit.
Figure 4B:
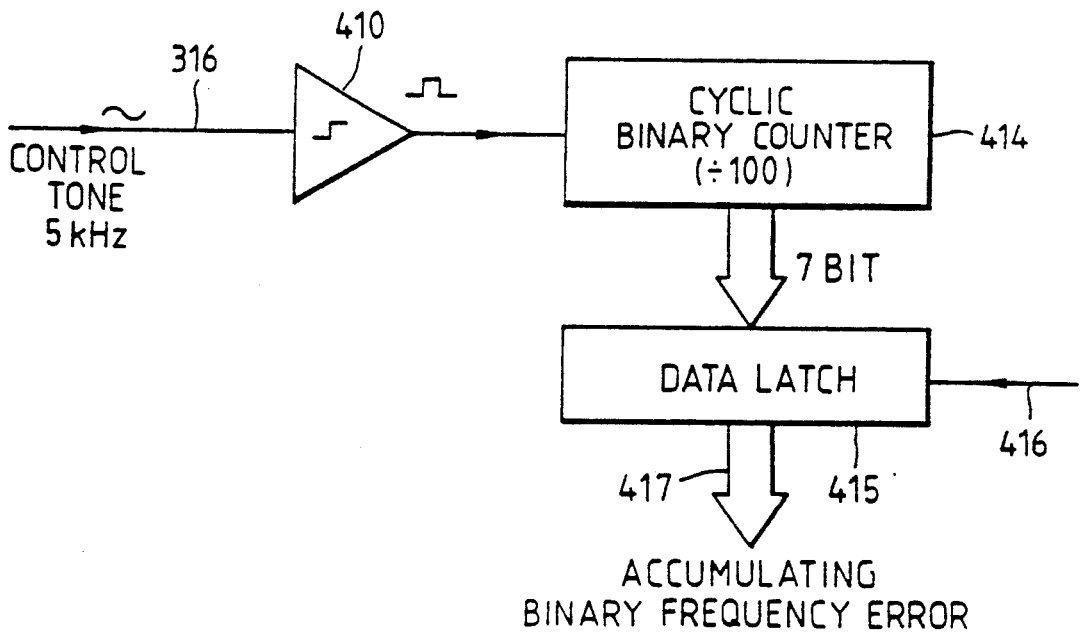
FIG. 4b shows a modification of FIG. 4a used for drift correction in FIGS. 1 and 3.
Figure 5:
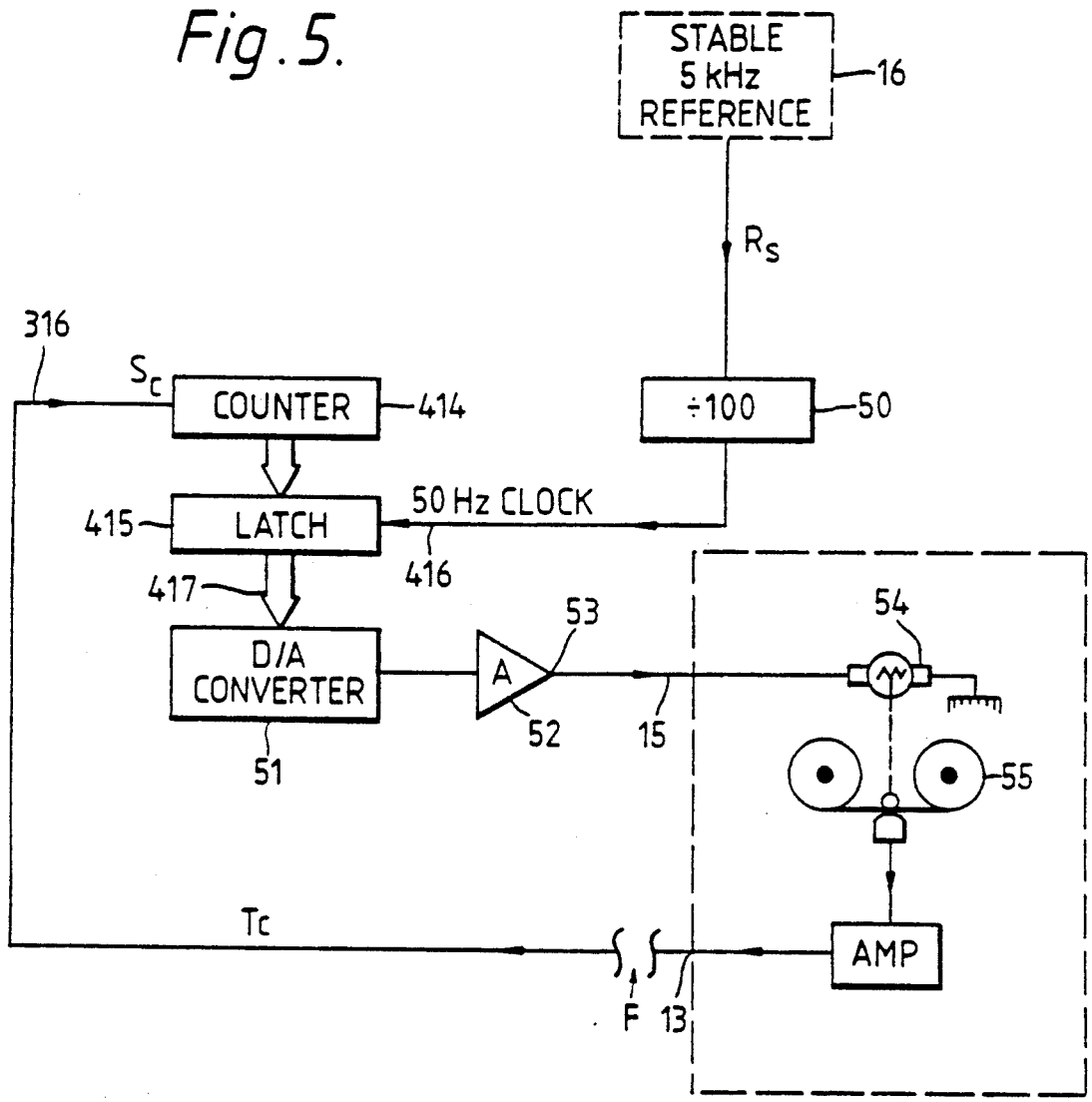
FIG. 5 is a block diagram of a drift compensation circuit adopting the FIG. 4b frequency counter.
Figure 6:
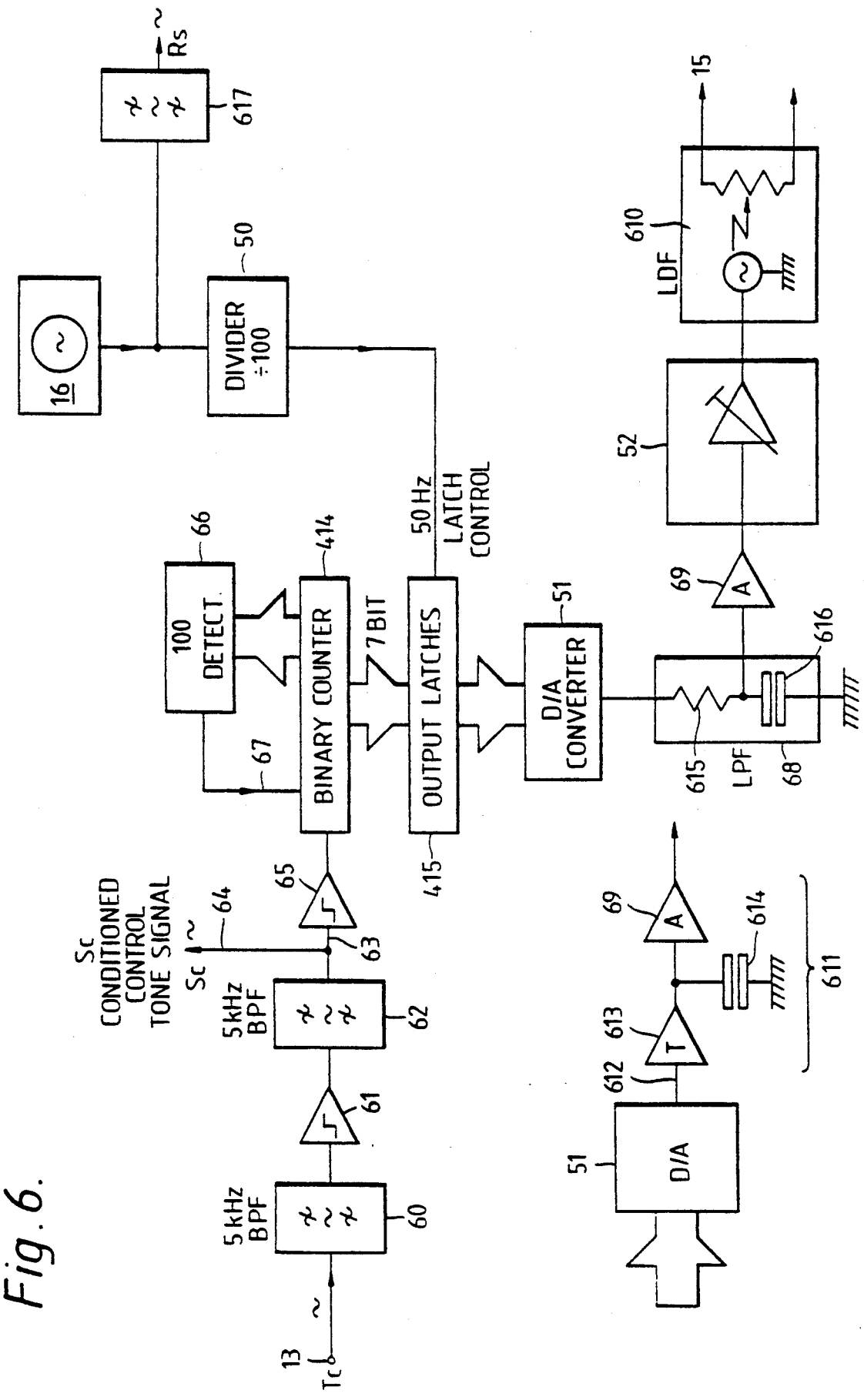
FIG. 6 is a more detailed block diagram of the FIG. 5 circuit.

FIGS. 4–6 will now be referred to for a more complete description of the drift correction. The drift correction circuit 317 (FIG. 3) determines drift by measuring the frequency of a control tone present in one or more playback channels. This measurement is made against a stable frequency reference. FIG. 4a shows a standard technique for frequency measurement. The control reference tone (316) after limiting (410) is used to step a binary counter 411 by one count for each cycle of the input control tone. Every second a 1 Hz signal (412) causes the binary count to be transferred to an output data latch store 413 and the binary count is then reset and a new count started. Thus frequency measurements are updated every second with a resolution of 1 in 5000 for a control tone of 5 kHz, i.e. an accuracy of ±0.01%. If a higher resolution is required the count period must be increased but the error of ±0.5 cycle will remain the same. For drift measurement it is desirable to have infinite resolution, zero error and a very short measurement period. These are conflicing requirements when using the existing FIG. 4a arrangement. FIG. 4b shows a frequency measuring circuit which overcomes this problem. The control tone (316) is connected to a cyclic binary counter 414 which counts the input signal cycles without being reset. The count is latched to a data latch 415 at a much higher clock rate of 50 Hz (414). The latch clocking frequency and the binary cycle count must be a harmonic ratio of the control tone frequency (5 kHz). Thus where the counter 414 is Divide-by-100 as shown, the latch clock frequency (416) must be 50 Hz or a multiple thereof. The output (417) from the data latch 415 will then automatically provide the frequency difference count between the control tone (316) and the stable reference source (16) used to produce the 50 Hz clock pulses (416). The resolution is infinite and the counter error is zero and the update rate (50 Hz) is very high.

FIG. 5 illustrates a use of the FIG. 4b cyclic frequency counter in a drift correction circuit 317. Filters (F) between the tape recorder output 13 and the input (316) to the cyclic counter 414 are not shown for convenience. The 50 Hz clock pulses for the data latch 415 are produced from the stable 5 kHz reference 16 by means of a divide-by-one hundred circuit 50. The 50 Hz signals representing the accumulating binary frequency errors (417) at the output of the data latch 415 is converted by a digital-to-analogue converter 51 and an adjustable amplifier 52 into a control voltage signal 53 for connection to a speed control input 15 of the tape capstan motor 54. The arrangement provides a negative feedback speed control loop such that if the speed of the capstan motor 54, and hence the tape 55, is faster than it should be the control tone frequency (316) from the playback amplifier 56 will increase (i.e. 5 kHz+f, where f is the frequency increase). This increase in frequency produces an increasing error count in the cyclic count circuit output 417 and thus a larger output from the D/A converter 51. After appropriate amplification (52) and 'sense' inversion this output is used to reduce the speed of the motor 54. Conversely, if the speed of the motor 54 is lower than it should be the control tone frequency will decrease (5 kHz−f) and the feedback loop will then increase the speed until it is correct again. Thus the tape speed is continuously adjusted to maintain a zero frequency difference and a minimised count error between the reference source and the control tone, irrespective of the playback period. This means that there will be no time drift from the start of the recording to the end, relative to absolute time. The maximum time shift error, after initial stabilisation, will normally be less than ±0.5 Hz, i.e. 0.0001 secs for any length of recording. This time error will be reduced to a very much smaller value by the wow and flutter correction (314, 315) to be described in greater detail.

FIG. 6 shows the FIG. 5 drift correction circuit in greater detail. The control tone (13) from the tape recorder playback output is bandpass filtered (60) to improve the signal to noise ratio, then limited (61) to remove any amplitude variations and then bandpass filtered to remove harmonics. The output signal $S_c$ is then used as input (63) to the drift correction circuit and as input (64) to each wow and flutter correction circuit. The function of this filtering and limiting is to remove, as far as possible, fading and dropouts in the control tone signal $T_c$. The input signal (63) to the drift correction circuit is limited once more (65) before connection to the binary counter 414. The cycling of the counter 414 is determined by a detector 66 responsive to binary 100 to produce a reset signal 67 for the counter. The 50 Hz control tone samples from the D/A converter 51 are low pass filtered (68) and amplified (69) before connection to the feedback loop gain adjustment amplifier 52. The output signal from the amplifier 52 is connected to the input of a light dependent resistor circuit 610, the output of which is connected to the tape motor speed control 15 of the tape recorder. An improvement to the drift correction performance can be obtained if the low pass filter 68 is replaced by a true voltage integrator circuit 611 as also indicated in FIG. 6. As shown the output 612 from the D A converter 51 is transmitted via a transconductor 613/capacitor 614 integrator in place of the resistor 615/capacitor 616 integrator in the low pass filter 68. Also shown in FIG. 6 a filter 617 is connected to the output of the local oscillator 16 to provide a signal $R_s$ for use as the recording control signal and for use in the phase correction circuits.

Figure 7:
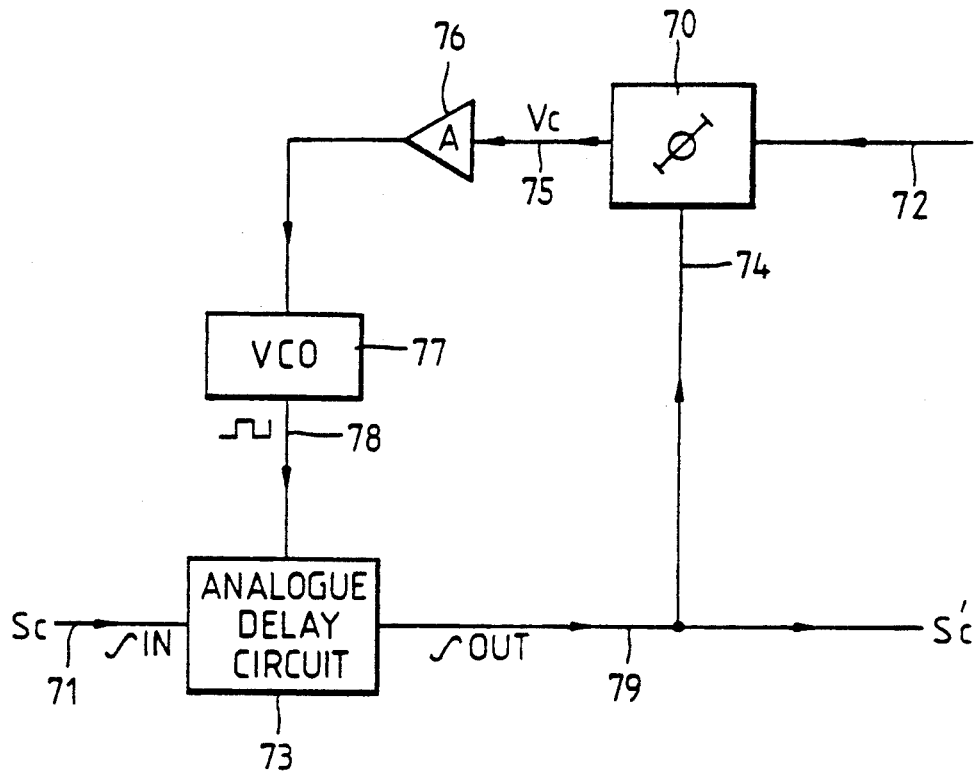
FIGS. 7 and 8 illustrate a block diagram and detector response for a wow and flutter circuit.
Figure 8:
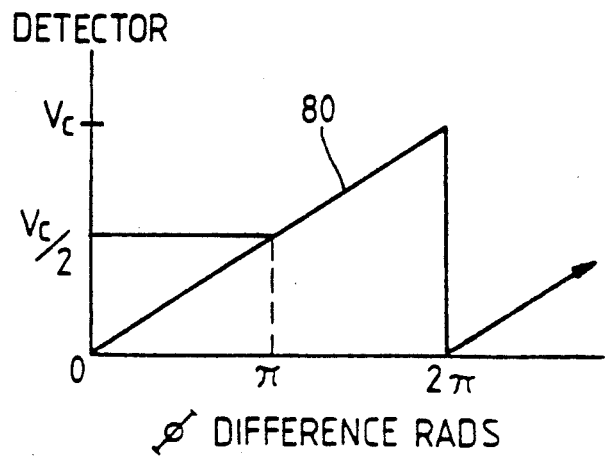

FIG. 7 shows a simple schematic negative feedback configuration including a phase detector 70 wherein the control tone $S_c$ (71) and the reference $R_s$ (72) are compared. The control tone $S_c$ (71) passes through a programmable analogue delay device 73 before connection (74) to the phase detector 70. The phase detector output $V_c$ (75) has a linear response 80 for phase differences between 0 and $2_{11}$ as shown in FIG. 8. $V_c$ is amplified (76) and then used to modulate a voltage controlled oscillator (VCO) 77. The VCO 77 provides a clock output signal 78 which varies the signal time delay through the analogue delay device 73. The feedback loop is arranged such that if the instantaneous phase, seen at the detector 70, advances (i.e. an increase in frequency) the VCO 77 frequency is reduced (by the amplified detector output) and this produces an increased time delay through the analogue delay device 73. Conversely reduced frequencies of $S_c$ detected by the circuit are increased by the delay device 73. The output $S_c$ (79) will thus have a reduced frequency deviation (wow and flutter).

Figure 9:
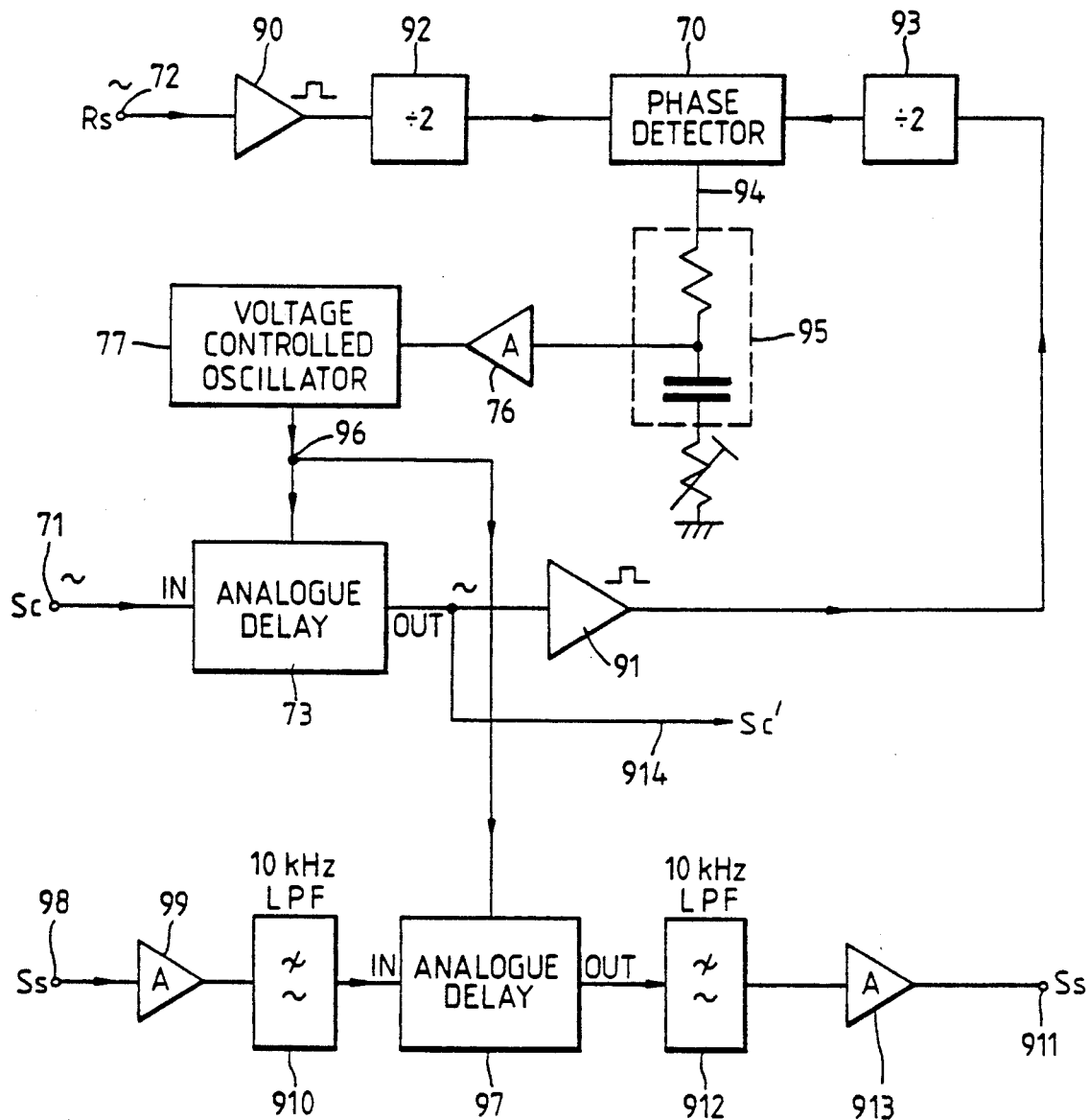
FIG. 9 is a block diagram of a wow and flutter correction circuit incorporating the FIG. 7 circuit.

The FIG. 7 circuit is used as shown in FIG. 9 to correct the analogue signal output $S_s$ (FIG. 1) from the tape recorder. The reference signal $R_s$ (72), and the drift connected control tone $S_c$ (71) delayed by the analogue delay device 73 are both limited 90, 91 then passed through divide-by-two circuits 92,93 before phase difference detection (70). The phase difference signal output 94 is low pass filtered (95) by a 6 dB per octave filter before amplification (76) and connection to the VCO (77). The VCO clock output (96) is connected to a second programmable analogue delay device 97, identical to the delay 73 operating on the control tone $S_c$. The second delay 97 is placed in the path of the analogue signal output $S_s$ (90) from the tape recorder. Before connection to the delay 97 the analogue signal $S_s$ is amplified (99) and then filtered by a 10 kHz low pass filter 910. The wow and flutter corrected output $S_s'$ (911) from the delay is first filtered by a 10 kHz low pass filter 912 and then amplified (913). An output connection 914 carries the drift, wow and flutter corrected tone signal $S_c'$ for measurement of residual fluctuation or for cascaded wow and flutter reduction processing. Since the circuit shown operates to reduce measured wow and flutter in the control tone $S_c$, it also reduces wow and flutter in the analogue recorded signal $S_s$.

Figure 10:
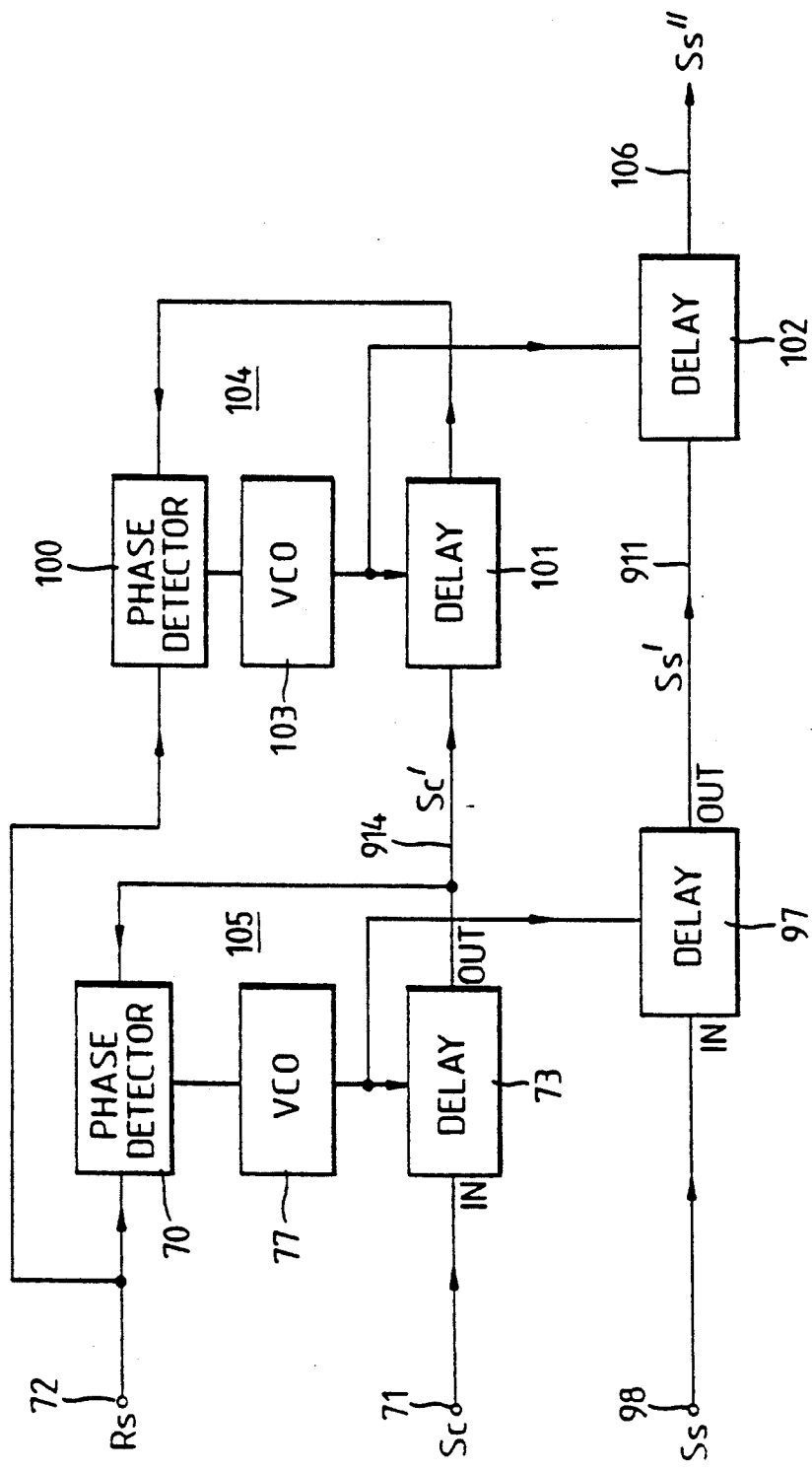
FIG. 10 is a modified FIG. 9 circuit using cascaded feedback phase detection circuits.

Since the corrected tone and analogue signals outputs $S_c'$ and $S_s'$, 914 and 911, have the same wow and flutter, now at a greatly reduced level, the process of wow and flutter reduction can be repeated using the simplified cascaded circuit shown in FIG. 10 (with filters, amplifiers and limiters omitted for clarity). As can readily be seen the reference signal $R_s$ (72), the corrected tone from the tape $S_c'$ (914) and the corrected analogue recorded signal $S_s'$ (911) are connected respectively to a second phase detector 100, a first delay 101 and a second delay 102. The phase detector 100, delay 101 and a VCO 103 are arranged in a second feedback loop 104 similar to the first feedback loop 105. The further reduction in wow and flutter by this circuit results in a double corrected output signal $S_s''$ at the output 106 of the delay 102.

At a cost in circuit complexity the drift, wow and flutter correction circuitry may be made to operate on embedded control signals recorded in each tape recorder channel. As mentioned earlier, this reduces inter-channel skew effects.

It can be shown that the wow and flutter component at the output of a single correction stage will be reduced by a factor:

$$1/(A/f_m+1)$$

where A is the loop gain of the circuit and $f_m$ is the wow and flutter variation frequency. This is because the wow and flutter feedback loop contains a simple 6 dB/octave filter which decreases the loop gain inversely proportional to the modulation frequency $f_m$. The level of correction will therefore be approximately inversely proportional to the frequency of the wow and flutter variation. The above formula may be applied to a typical measured recorded output where the modulation index B=36, since;

$$B = f_c/f_M,$$

where input frequency variation $f_c = \pm 54$ and $f_m = 1.5$ Hz.

Using a loop gain A of 73, the output modulation index B', after correction, is given by:

$$B' = \frac{B}{(A/f_m + 1)}$$
$$= \frac{36}{(73/1.5 + 1)} = 0.72$$

The deviation frequency $f_c$ after correction is therefore ±1.1 Hz.

For a two stage cascaded correction circuit the overall reduction in wow and flutter is given by:

$$\frac{1}{(73/1.5 + 1)^2}$$

In the above example, the output modulation index would be 0.015 and the final output deviation frequency would be ±0.02 Hz.

The figures given above have been found to agree with the measured values.

Figure 11:
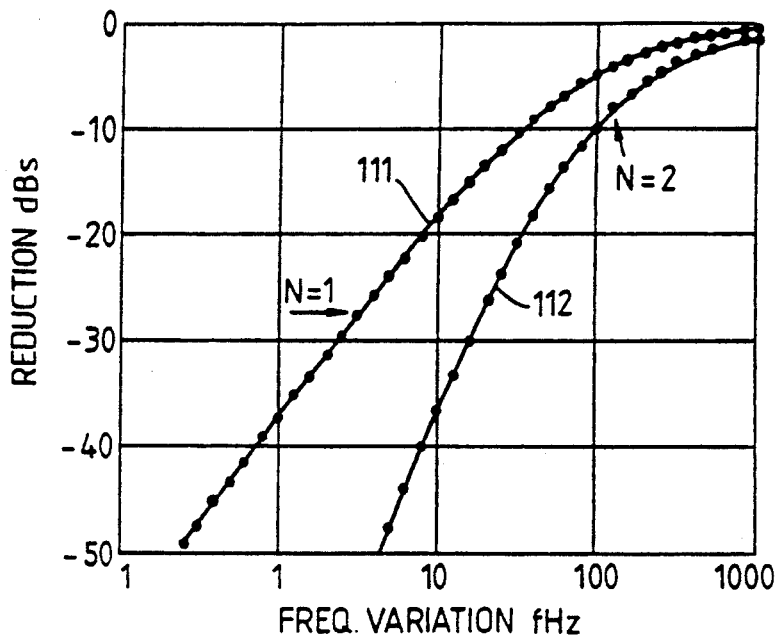
FIG. 11 is a graph showing the predicted wow and flutter reduction performances for the FIG. 9 and 10 arrangements.

FIG. 11 shows the anticipated performance of the correction system for single (111) and 2-stage (112) cascaded configurations over a range of wow and flutter variation frequencies. The reduction figure in dBs is the ratio change between the output modulation index (or frequency deviation) to the input index (or deviation). From the previous example, for a 1.5 Hz wow signal the reduction is about 34 dB for a single correction system, whilst for 10 Hz it is about 18 dB. These ratios would be doubled for the 2-stage cascade circuit.

Referring again to FIG. 9, the 6 dB/octave low pass filter 95 introduces some undesirable phase delay/distortion and a limited loop gain of 73 was selected to minimise the risk of circuit instability. By implementing the circuit principles shown with established digital processing techniques a higher loop gain can be achieved without the associated fall off in frequency. These circuits would be made more stable, more reliable, and with enhanced performance. In addition the tape motor speed control would be improved by digital implementation. Such digital implementation will be apparent to those skilled in this art and circuit details are therefore not given.

The drift, wow and flutter correction system described can be used to dramatically improve the phase, frequency and time keeping (drift) characteristics of any recording process. The accuracy and stability of the correction process depends entirely upon the stability of the reference tone being used during recording and playback. The amount of wow and flutter correction will depend upon the wow and flutter frequency of variation and the loop gain value of the system, 'A'. Generally, the lower the wow and flutter variation frequency, then the better the correction will be, as shown in FIG. 11. Cascaded systems can be used to provide even better correction characteristics but care must be taken to ensure that the dynamic range is not reduced by spurious signals produced within the analogue delay devices. This however can be avoided if digital techniques are used for analogue delay lines.

Figure 12:
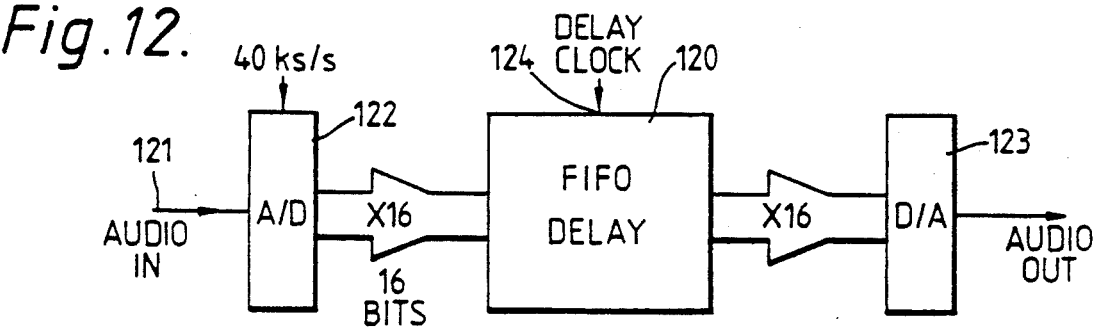
FIGS. 12 and 13 are block diagrams of digital delays for use in the wow and flutter correction circuits.
Figure 13:
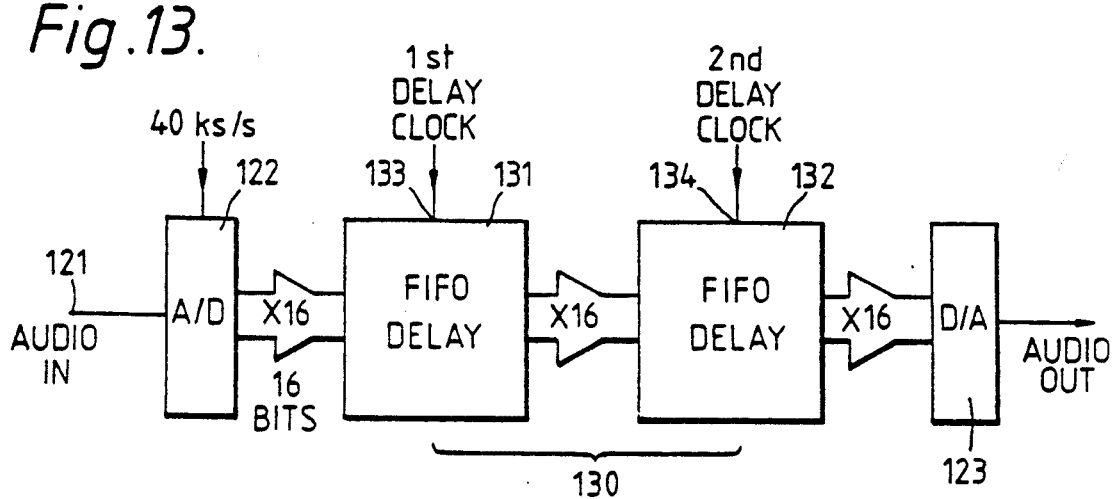

FIGS. 12 and 13 show single and 2-stage digital delay lines 120, 130 which can replace the analogue delay devices shown in the previous circuits. In both arrangements the audio input signal 121 is sampled at 40 kc/s by a 16-bit A/D converter 122 and the 16-bit output from the digital delay is reconverted to an analogue audio signal by a D/A converter 123. The single correction stage includes a single digital 'First in First out' (FIFO)

delay 120 controlled by a delay clock signal (124). The 2-stage correction circuit includes series connected FIFO delays 131 and 132 controlled by first and second delay clock signals (133 and 134).

This control technique can not only be used to upgrade the quality of existing 'professional' instrument tape recorders but it can also be used to transform the performance of what would normally be unacceptable very poor systems, such as compact (personal) tape recorders. This has very important applications where the cost of producing a consumable miniature, robust, high quality recorder would otherwise be prohibitive.

Although specifically designed for recording systems the technique described herein can also have applications in other areas where the signal 'propagating' medium has a delay which is time variant but which is otherwise non time dispersive.

Figure 14:
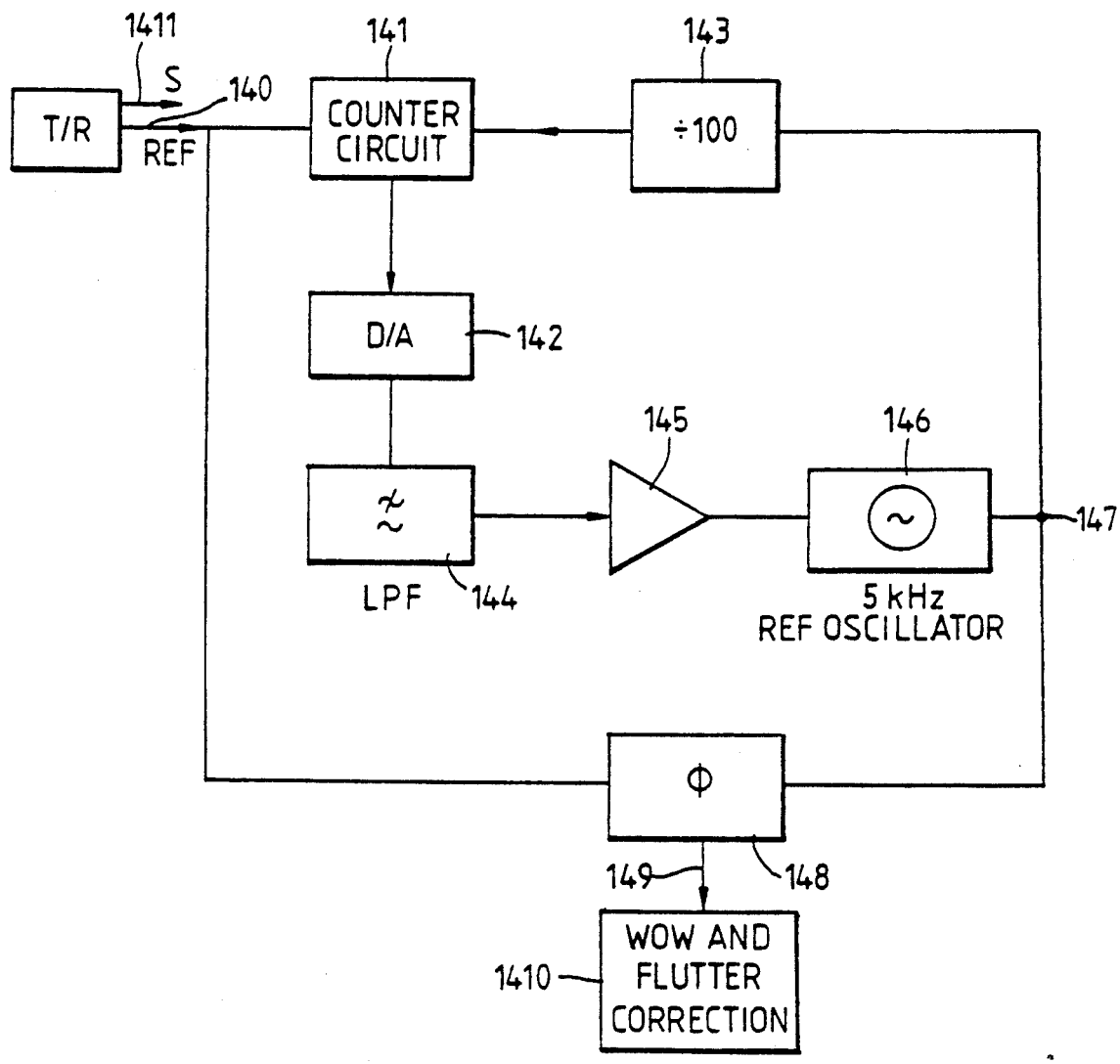
FIG. 14 is a schematic block diagram of an alternative form of the invention.

The invention requires correction of the drift before phase corrections can be applied, and in the arrangements described drift is corrected by control of the tape capstan drive motor. This control may be direct or for convenience it could be via a light sensitive resistor circuit as shown, depending upon the tape recorder being used. In some tape recorders drift may not be a serious problem and also it may be desirable to control wow and flutter without controlling the capstan drive motor. FIG. 14 shows a possible alternative arrangement for the invention for these cases. The reference signal at output 140 includes components of drift, wow and flutter. Instead of correcting this reference signal for drift, this circuit arrangement imposes a similar drift on the local oscillator reference signal to enable a phase comparator circuit to correct for wow and flutter. The output 140 is connected to a counter circuit 141, as in FIG. 6, with an output connected to a D/A converter 142 by latch control signals from a divide-by-hundred circuit 143. The output from the D/A converter 142, is connected via a low pass filter 144 and amplifier 145 to a control input of a 5 kHz reference oscillator 146. The arrangement is such that the frequency of the oscillator output 147 is locked to the mean frequency of the reference signal at the output 140 of the tape recorder. In similar manner to the previous examples this local reference signal output 147 and the recorded reference output 140 are connected to a phase comparator circuit 148 by means of which (149, 1410) a delay element in the signal output 1411 from the tape recorder is adjusted to compensate for wow and flutter variations. As before this approach may be applied to embed recorded reference signals and cascaded phase correction circuits may be used.

In the arrangements thus far described, the output from the tape-recorder has random phase variations superimposed on the signal after correction by the tape speed controller. Correct operation of the phase error correction circuits described requires that the phase variations at the input to the delay lines used are uncorrelated with the output. This is ensured by making the delay long enough. The circuits work by comparing the phase of the delay output with the phase of a reference signal. If the output phase lags then the clocking rate of the delay is speeded up for correction and visa versa. At the input, however, the effect of speeding up the clock rate of the delay is to increase the rate of sampling of the signal from the tape-recorder and thus to slow down the sampled signal in the delay. As these samples work through to the output of the delay a further speeding up of clock rate occurs. If the length of the delay is long enough such that input and output are uncorrelated then this phenomenon is not harmful, however, where there is correlation there could be an uncontrolled rise in the clock rate. A further disadvantage of the described arrangements arises from the use of a low pass filter in converting the output from the phase comparator to a voltage signal for varying the frequency of a voltage controlled oscillator. This arrangement does not work quickly and so the correction falls with increasing frequency.

Figure 15:
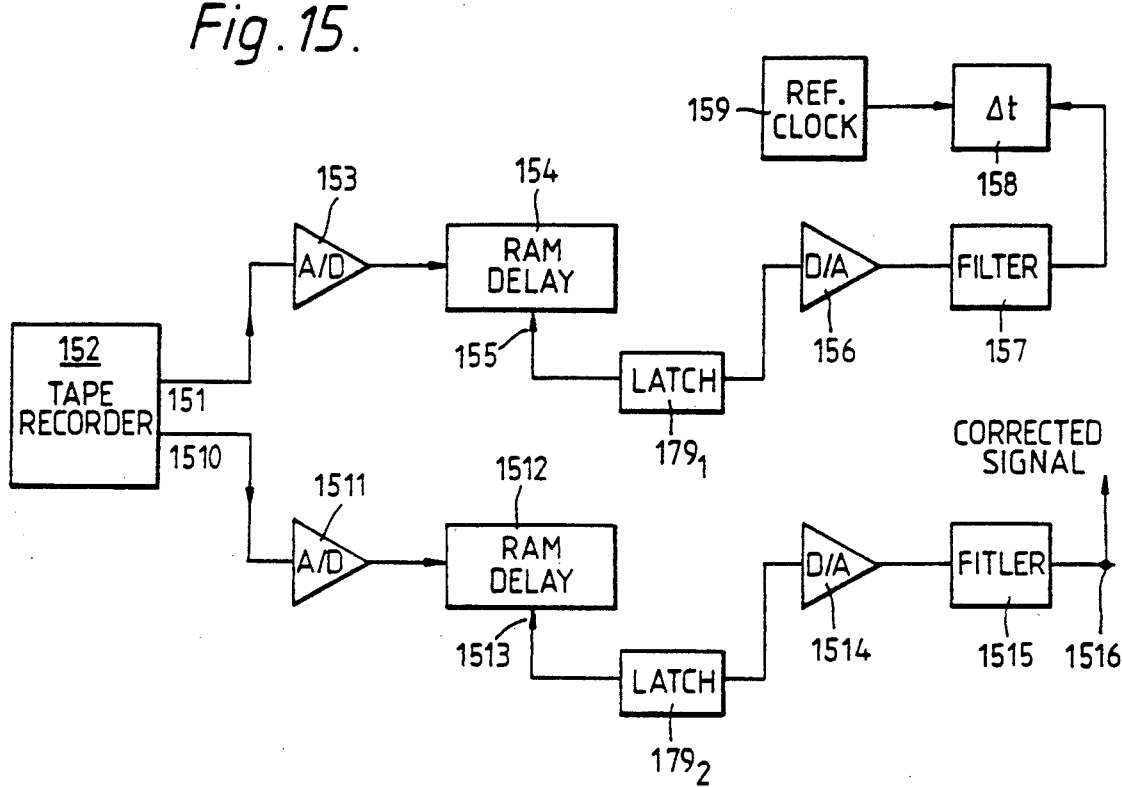
FIG. 15 is a schematic representation of a digital circuit arrangement of the drift, wow and flutter correction circuit applied to a tape recorder.
Figure 16:
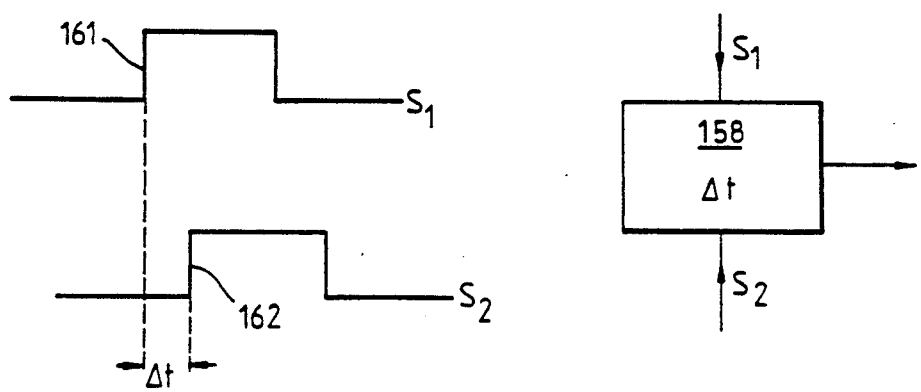
FIG. 16 is a diagram to illustrate the operation of the FIG. 15 phase difference measurement circuit.
Figure 17:
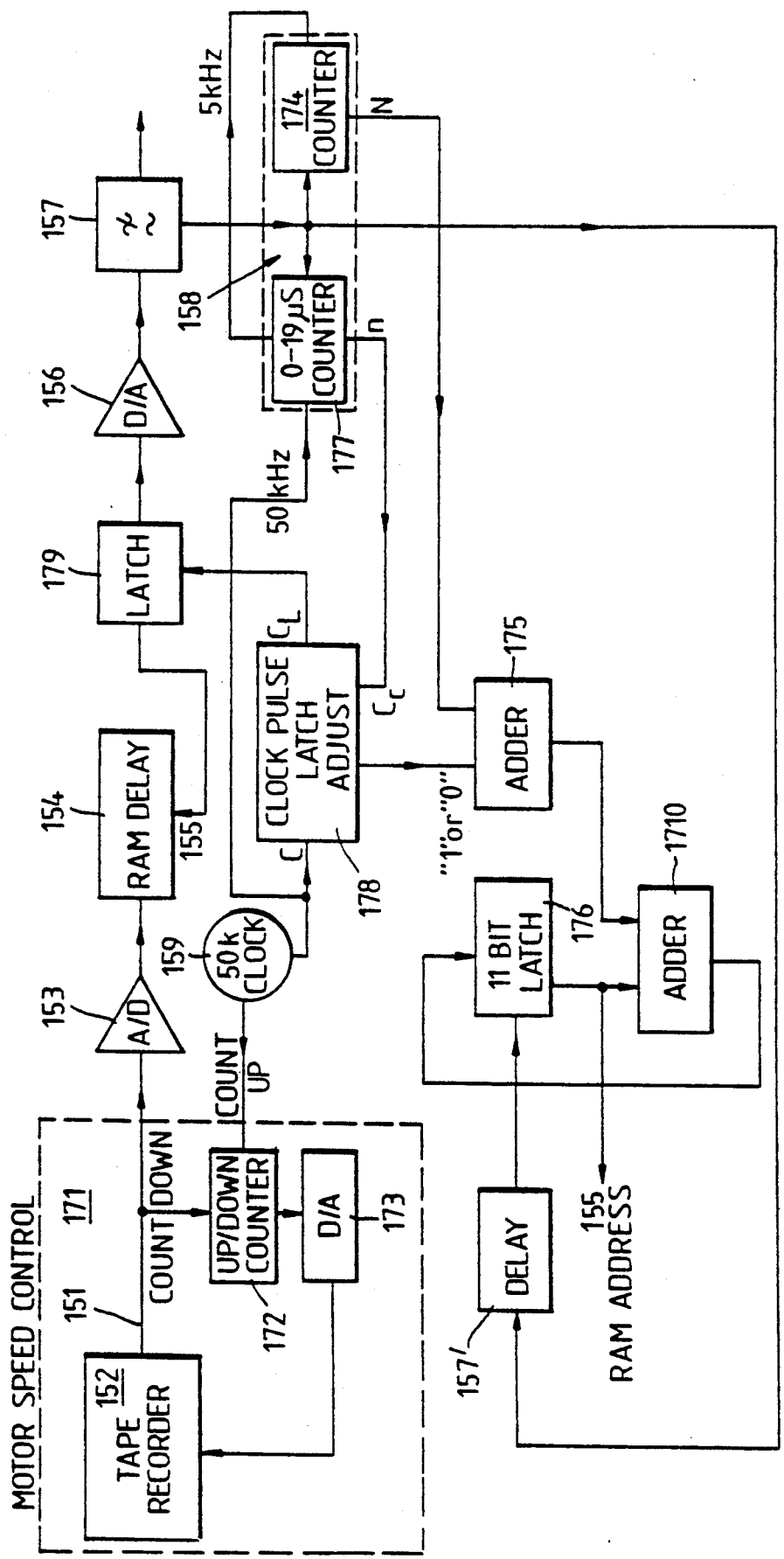
FIG. 17 is a more detailed version of FIG. 15 showing the tape recorder speed control and the tape signal correction circuitry.

A modification of the tape recorder circuits, with tape speed corrected for the sake of clarity, is illustrated in FIGS. 15 and 16 using digital ciruitry. The speed control and detailed circuit arrangement are shown in FIG. 17. A control signal 151 from the tape-recorder 152 is digititally sampled by an analogue to digital converter 153. The output of the A/D converter 153 is connected to a variable delay shift register 154 implemented in random access memory (RAM). Control signal samples are read out by a programmable tap connection 155 shown centrally positioned along the delay 154, the tap position therefore determining the sample delay. The digital samples are then connected via an output signal latch $179_1$ to a digital to analogue converter (D/A) 156, filtered (157), then connected to one input of a comparator circuit 158. A clock reference signal 159, having the same frequency as the recorded control signal, is connected to a second input of the comparator 158. The comparator measures the time differences between successive cycles of reference and control signals. These time differences are added to the read address (155) to the delay 154. By this means the read position of the delay RAM is advanced or retarded with respect to the write address depending on whether the time difference is positive or negative and the delay is varied to reduce the time difference measured by the comparator 158 to zero. The signal output 1510 from the tape-recorder 152 is connected in similar manner via A/D converter 1511, RAM delay 1512, RAM read out 1513 via signal latch $179_2$ to D/A converter 1514, and filter 1515 to the output 1516. The read out address (1513) of delay 1512 is controlled in the same way as the read out from the control signal delay 154 by the output from the comparator 158. Operation of the RAM output latches $179_1$ and $179_2$ will be described below with reference to FIG. 17. In this arrangement the control signal 151 and the signal 1510 from the tape-recorder may, for economy, be digitised with different resolution A/D conversions. For example a much higher resolution (14 bits) may be adopted for the signal channel to retain signal fidelity, whereas the control signal can use a much lower resolution of 8 bits (say).

The operation of the comparator 158 can be appreciated more easily by reference to FIG. 16. The reference and control signals $S_1$ and $S_2$ to be compared are limited to produce square waves and the leading edges 161, 162 are used respectively to clock and read a 1 MHz counter which enables the time difference $\Delta t$ to be measured to an accuracy of $\pm \frac{1}{2}$ $\mu$sec. In one particular arrangement using a 5 kc/s control signal, a 2 kbit RAM delay 154 is used and the signal is sampled at a rate of 50 kc/s; i.e. the delay 154 is clocked at this rate. Thus about 200 cycles of the control signal are stored in the delay 154. Changing the tap 155 by one position is then equivalent to a delay change of 20 $\mu$sec. The time difference $\Delta t$ is determined in the form $(N \times 20 + n)$ $\mu$sec where N and n are integers and n is in the range 0 to 19 $\mu$sec. N is then the number corresponding to the change of address of the tap 155, positive or negative, and n is a fine adjustment delay applied to the output signal latches $179_1$ and $179_2$.

As shown in FIG. 17 the tape motor speed control 171 is effected by connecting the control signal output 151 from the tape recorder to the "count down" input of an up/down counter 172 and a 50 kHz reference signal from the clock 159 is connected to the "count up" input. The digital count output from the up/down counter 172, representing the time difference (control cycles) between the control signal from the tape recorder and the reference signal, is connected to a digital to analogue converter 173. The analogue output from the D/A converter 173 is then connected to the tape recorder to control the playback tape speed in similar manner to the FIG. 5 arrangement.

The drift corrected control signal after transmission through the programmable RAM delay 154 is connected to the $\Delta t$ measuring circuit 158 where the phase time difference from the reference signal from clock 159 is measured. The time difference is recorded by two counters: Counter 174, clocked by a 5 kHz signal giving the number N of 20 $\mu$sec intervals and a second counter 177, clocked by the 50 kHz reference signal, giving the number n corresponding to microseconds in the range 0-19 $\mu$sec. The number N in the binary counter 174 shall be arranged to count the reference clock (derived from 159) such that the count number will run from $-5$ (minus 5) through zero to $+5$ (plus 5) then reset to $-5$ and repeat thereafter. In this manner the time difference $\Delta t$ in 158 will normally be zero but will read positive (0 to $+5$) for an increase in time delay of control signal, $S_2$, and will record a negative number (0 to $-5$) for an advanced time delay of control signal $S_2$, relative to reference signal $S_1$. In this fashion the RAM address, 155, will be either advanced or retarded in time if the signal is retarded or advanced respectively and will therefore have all time delays (to 1 $\mu$sec accuracy) removed. The corrected signal will therefore always be within $\pm 1$ $\mu$sec of time (referred to reference) and the maximum wow and flutter time distortion will also be with $\pm 1$ $\mu$sec and this will be irrespective of the taperecorder wow and flutter deviation or rate of deviation (modulation frequency). The number n is connected to a clock phase latch adjusting circuit 178. The phase adjuster 178 provides a clock latching output signal $C_L$, dependent on n, to control the phase delay of the clock 159 which is used to operate a one sample (8 bits wide) latch 179. Since the phase of the control signal may be advanced or retarded in comparison with the reference signal, the value of N (the number of 20 $\mu$sec intervals by which the RAM delay address 155 is changed) must be adjusted to ensure that n always represents a phase delay. This is achieved by adding to N in an adder 175 a binary 1 whenever the desired phase change $C_c$ for latch 179 is greater than the existing latch phase delay $C-C_L$. This "change of address" output from adder 175 is then added to the current RAM tap Read address (held in latch 176) in a further adder 1710. The output from this adder is then stored in latch 176 fusing a delayed (157') version of the control tone from filter 157—to allow for signal propagation delays through address 175 and 1710] and provides the new address for the tap 155. At start-up, the RAM address latch 176 has an address corresponding to the centre address of the RAM 154.

As described, the n counter 177 and the binary ($-5$ to 5) counter 174 are arranged such that the remainder n always represents a delay for retarding the 50 kHz clock 159 used to clock signal samples from the delay 154. Thus if $\Delta t = -50$ $\mu$s, representing the time needed to retard (in time) the control signal, then N is set at $-2$ and n at 10 $\mu$s. Thus the read address is delayed by two additional places away from the RAM write address (FIG. 15), representing an increase in RAM delay of 40 $\mu$s, and the output latch clock pulses are delayed by $n = 10$ $\mu$s. Where a time advance $\Delta t = 45$ $\mu$s (say) is required, the circuitry is arranged such that the binary counter N is increased by 3, i.e. binary 3 is added to the read address and the read tap is moved three places closer (earlier) to the RAM write address (FIG. 15) corresponding to an advance of 60 $\mu$s. The remainder n is then provided as a delay of 15 $\mu$s to the output latch (179) clock $C_L$ whereby the resulting advance is 45 $\mu$s. The output latch 179 thus provides a means by which the signal output can be time corrected in 1 $\mu$sec intervals. Without this latching technique the signals could only be corrected in 1 $\mu$sec intervals (signal sampling rate) by altering the read address. to achieve this accuracy otherwise would require a 1 MHz clock RAM, 40 kbits long, and an A/D converter operating at 1 MHz. This is neither practicable nor affordable.

As in the arrangements described previously the comparator 158 is arranged to provide signals for simultaneous adjustment of the phase output latch $179_2$ clock $C_L$ and the read address for the signal delay 1512. The output signals from the delays 154 and 1512 after conversion to analogue form are passed through anti-sampling filters 157 and 1515 respectively to filter out the sampling frequencies (50 kHz). The filter 157 must have an impulse response of less than 200 $\mu$secs for otherwise the phase/time corrections made to the control signals will not have propagated through the RAM (154), latch (179), filter (157) and comparator (158) by the time (200 $\mu$sec later) the next correction is to be made. If this should happen the 'system' may "recorrect" the same previous time errors. This could then lead to either instability or a sustained "ringing" effect in the correction circuit and therefore on the signals.

In alternative arrangements the circuitry could be arranged such that an adjustment is first made and thereafter at 400 $\mu$s intervals (or multiples of 200 $\mu$sec where the control tone is 5 KHz giving a period of 200 $\mu$sec) rather than every 200 $\mu$s. By this means the impulse response (ringing time) delay of the filter 157 may be allowed to be greater without causing instability.

I claim:

1. A signal correction system for correcting playback of a signal, said system including:
   a recording system, said recording system including a means for recording said signal and a control reference tone; and
   a playback receiving means for playing back said recorded signal and said recorded referenced tone, wherein said receiving means includes:
   a local oscillator means for generating an identical tone to said control reference tone;
   frequency comparator means for comparing a frequency of said recorded reference tone with a frequency of said local oscillator means tone, said comparator means including a continuously counting cyclic counter for providing an output indicative of any accumulated difference in frequency of said recorded reference tone and frequency of said local oscillator means tone;

drift correction means, responsive to the comparator means, for applying a common frequency shift to the played back signal and said played back control reference tone, and for reducing to zero any difference output from the comparator means and for providing a drift-corrected signal and a drift-corrected control reference tone;

a phase comparator circuit for comparing phase of said drift-corrected reference tone with phase of the local oscillator means tone and for providing an output indicative of any phase difference between said drift-corrected reference tone and said local oscillator means tone; and short term fluctuation correction means, responsive to said phase comparator circuit output, for applying to said played back signal and the drift-corrected reference tone, a common phase delay to reduce to zero any difference output from said phase comparator circuit, thereby providing a drift-corrected and phase corrected played back signal.

2. A signal correction system for correcting transmission of a signal, said system including:

a transmission system, said transmission system including a means for transmitting said signal and a control reference tone; and a receiving means for receiving said transmitted signal and said transmitted referenced tone, wherein said receiving means includes:

a local oscillator means for generating an identical tone to said control reference tone;

frequency comparator means for comparing a frequency of said received control reference tone with a frequency of said local oscillator means tone, said comparator means including a continuously counting cyclic counter for providing an output indicative of any accumulated difference in frequency of said received control reference tone and frequency of said local oscillator means tone;

drift correction means, responsive to the comparator means, for applying a common frequency shift to the received signal and said received control reference tone, and for reducing to zero any difference output from the comparator means and for providing a drift-corrected received signal and a drift-corrected control reference tone;

a phase comparator circuit means for comparing a phase of said drift-corrected control reference tone with a phase of the local oscillator means tone and for providing an output indicative of any phase difference between said drift-corrected control reference tone and said local oscillator means tone; and short term fluctuation correction means, responsive to said phase comparator circuit output, for applying to said drift-corrected received signal and the drift-corrected reference tone, a common phase delay to reduce to zero any difference output from said phase comparator circuit, thereby providing a drift-corrected and phase corrected received signal.

3. A signal correction system as claimed in claim 1 or 2, wherein said cyclic counter comprises a cyclic binary counter having an output said cyclic binary counter is clocked by a signal derived from the local oscillator means.

4. A signal correction system as claimed in claim 3 further including a detector, wherein cycling of the binary counter is determined by said detector connected to said binary counter and responsive to a predetermined binary number ($N_p$) to provide a reset signal to the binary counter.

5. A signal correction system as claimed in claim 4 wherein a binary counter is produced by connecting an output from the local oscillator means to the input of a divide-by-$N_{p/n}$ divider, where n is an integer.

6. A signal correction system as claimed in claim 5 wherein the output from the binary counter is clocked into an output latch circuit and a latch output is connected to a D/A converter said latch circuit and said D/A converter comprising a means for producing analogue signal samples representative of the frequency time drift between the control reference tone and the local oscillator means tone.

7. A signal correction system as claimed in claim 6, further including an active voltage integrator circuit, wherein said analogue signal samples are connected to said active voltage integrator circuit, said integrator circuit comprising a transconductor and a capacitor.

8. A signal correction system as claimed in claim 6 the analogue signal samples are connected to said local oscillator means and comprise a means for changing the frequency of oscillation of said local oscillation means.

9. A signal correction system as claimed in claim 1 or 2 further including bandpass filter and limiting means for minimizing the effects of fading and dropouts on said control reference tone.

10. A signal correction system as claimed in claim 1, wherein the frequency comparator means comprises an up/down counter having a count down input and a count up input, the played back control reference tone and the local oscillator means tone are connected to respective count down and count up inputs, and an output difference signal is connected to a means for reducing to zero the frequency difference between the played back control reference tone and the local oscillator means tone.

11. A signal correction system as claimed in claim 10, further including a digital time delay circuit and an A/D convertor for connecting said played back signal to a digital signal, wherein said common phase delay is applied by said digital time delay circuit, said time delay circuit comprising a programmable RAM delay, a series connected RAM latch, and a phase adjuster for the latch, where said digital signal is clocked in to a Write address of the RAM delay at frequency F and is read out from a programmable Read Address of said RAM delay to the latch to provide a time delay having incremental value $\Delta T$ of 1/F, a clock signal to the RAM latch is delayed by a digitised time having an incremental value $\Delta t$ in the range 0 to 1/F, to thereby provide an overall time delay to an accuracy of $\Delta t$.

12. A signal correction system as claimed in claim 11 wherein said phase comparator comprises:

limiter means for squaring the drift corrected control tone and the local oscillator control reference tone; and a counter responsive to the leading edges said squared tone and signal so as to be triggered by the local oscillator control reference tone and read by the played back drift corrected tone.

13. A signal correction system as claimed in claim 12 wherein said counter has a clock frequency which is n times the frequency F and the phase comparator circuit measures the phase difference in units of N+R where the units of N are 1/F and the units of R are 1/nF.

14. A signal correction system as claimed in claim 13 further including means for modifying said phase difference N+R, which may be positive or negative, by a conditional change of N such that R always represents a delayed phase difference.

15. A signal correction system as claimed in claim 14 further including an adder, wherein a Read address for the RAM is stored in a Read latch connected to said adder such that it can be adjusted by said modified N and R to set the delay for the RAM latch.

16. A signal correction system as claimed in claim 1 for reduction of drift, wow and flutter in a tape recorder, said tape recorder including at least one record head, wherein said local oscillator means comprises a single stable reference oscillator connected to the tape recorder such that, during recording, said control reference tone is applied to said at least one record head of said tape recorder with the frequency comparator means and phase comparator circuit disabled, and, on playback, the recorded signals to be corrected, together with the played back control reference tone, are connected to the local oscillator means, frequency comparator means, drift correction means, phase comparing circuit and short term fluctuation correction means.

17. A signal correction system as claimed in claim 16 wherein said tape recorder is a multichannel tape recorder and said control reference tone is provided as a reference embedded in each input channel of said multichannel tape recorder.

18. A signal correction system as claimed in claim 16, wherein the control reference tone is provided as a reference in a dedicated reference channel.

19. A signal correction system as claimed in claim 17 or 18 wherein said tape recorder includes a tape capstan motor drive and the drift correction means includes a drive signal connected from the output of the frequency comparator means to the tape capstan motor drive for varying the capstan motor drive speed.

20. A signal correction system as claimed in claim 19 wherein a light dependent resistor is used to correctly interface between the frequency comparator and the tape capstan motor drive.

21. A signal correction system as claimed in claim 1, wherein said correction means comprises a fast programmable delay circuit and a voltage controlled oscillator (VCO), a voltage output from the phase comparator (70) is connected to an input of the VCO and a VCO output is connected to the delay circuit to minimize said phase comparator circuit phase difference output.

22. A signal correction system as claimed in claim 21 further including limiters connected to the inputs of the phase comparator circuit.

23. A signal correction system as claimed in claim 21 further including a second fast programmable delay circuit, wherein the output signal from the VCO is connected to said second delay circuit, identical to said first delay circuit: the drift corrected signal being connected to an input to the second delay circuit and a drift and short term fluctuation corrected signal provided at an output of said second delay circuit.

24. A signal correction system as claimed in claim 23 further including low pass filters connected at the input and output of the second fast programmable delay circuit.

25. A signal correction system as claimed in claim 23 wherein each delay circuit is a digital delay circuit.

26. A signal correction system as claimed in claim 25, wherein a plurality of phase comparator circuits are provided.

27. A signal correction system as claimed in claim 21, further including a 6 dB/octave low pass filter connected between the phase comparator means and the VCO.

* * * * *